United States Patent [19]

Shibata et al.

[11] 4,414,289

[45] Nov. 8, 1983

[54] HIGH DENSITY MAGNETIC RECORDING MEDIUM

[75] Inventors: Fujio Shibata, Komoro; Kenji Hirabayashi, Mitsuka-Saku; Chihoto Mikura, Kunitachi, all of Japan

[73] Assignee: TDK Electronics Co., Ltd., Tokyo, Japan

[21] Appl. No.: 359,413

[22] Filed: Mar. 18, 1982

[30] Foreign Application Priority Data

Mar. 23, 1981 [JP] Japan .................................. 56-40465

[51] Int. Cl.$^3$ .............................................. G11B 5/70
[52] U.S. Cl. .................................. 428/695; 252/62.54; 360/134; 360/135; 360/136; 427/128; 428/694; 428/900
[58] Field of Search .................... 428/694, 695, 900; 427/128; 252/62.54; 360/134–136

[56] References Cited

U.S. PATENT DOCUMENTS 3,029,157 4/1962 Sutheim ............................... 428/900
3,387,993 6/1968 Flowers ............................... 428/900

OTHER PUBLICATIONS

Hackh's, *Chem. Dict.*, Fourth Ed., McGraw-Hill, p. 302, New York 1969.

*Primary Examiner*—Ellis P. Robinson
*Attorney, Agent, or Firm*—Wyatt, Gerber, Shoup, Scobey & Badie

[57] ABSTRACT

A magnetic recording medium comprised of a nonmagnetic base and a magnetic coating layer thereon, said magnetic coating layer comprises ferromagnetic particles dispersed in a binder vehicle, characterized in that said magnetic coating layer contains a glyceride and a sorbitan ester of fatty acid.

5 Claims, No Drawings

HIGH DENSITY MAGNETIC RECORDING MEDIUM

BACKGROUND OF THE INVENTION

This invention relates to a high density magnetic recording medium. The magnetic recording media in common use are made by mixing ferromagnetic particles with a binder vehicle and coating a nonmagnetic base with the mixture. With the spread of applications for the media, there has been a growing demand for those capable of higher density recording.

The requirements to be met in order to permit the high density recording are understood to include the following:

(1) Great coercive force of the ferromagnetic particles.
(2) High intensity or amount of saturation magnetization (Is) of the ferromagnetic particles.
(3) Fineness of the ferromagnetic particles (preferably with a major axis of 0.4 μm or less and a minor axis of 0.04 μm or less).
(4) Uniform dispersion of the ferromagnetic particles in the binder vehicle.
(5) Smoothness of the magnetic coating film and freedom from spacing loss.

The requirements (1), (2), and (3) have come to be met by the improvement of acicular iron oxide, use of cobalt-adsorbed or cobalt-deposited acicular iron oxide, or more recently by the introduction of magnetic alloy powders composed chiefly of acicular iron particles. However, concerning the uniform dispersion of the ferromagnetic particles in the binder vehicle, the requirements (4) and (5) have been difficult to realize.

SUMMARY OF THE INVENTION

Therefore, the present invention is aimed at obtaining a smooth magnetic coating film in which acicular ferromagnetic particles having great coercive force, high saturation magnetization, and extra fineness (preferably with a major axis of 0.4 μm or less and a minor axis of 0.04 μm or less) are thoroughly and uniformly dispersed.

It has been found that the uniform dispersion is produced by adding a glyceride and a sorbitan ester of fatty acids when mixing very fine ferromagnetic particles (with a major axis of 0.4 μm or less and a minor axis of 0.04 μm or less) with a binder vehicle. Also, in this way, a smooth magnetic coating film is formed, achieving the aim of the invention.

DETAILED EXPLANATION OF THE INVENTION

The admixture of a glyceride and a sorbitan ester of fatty acids gives the best result when acicular, magnetic alloy particles are employed as the ferromagnetic particles.

This is because magnetic alloy particles have coercive force and saturation magnetization more than twice those of ordinary magnetic particles and the surface structure is so complex that the particles can hardly be dispersed uniformly in the binder vehicle.

The dispersed state of particles is evaluated in a variety of ways, e.g., in terms of the smoothness or irregularity of the coating film surface (which is observed by an optical microscope) or the magnetic properties of the film. Of those methods, the observation by an optical microscope is merely for qualitative determination. On the other hand, out of the magnetic properties of the resulting film, squareness ratio best represents the dispersed state. By squareness ratio is meant the ratio of the maximum residual magnetic flux density [Br] to the maximum saturation flux density [Bm] of magnetic coating film. The value is high when a ferromagnetic substance is thoroughly dispersed in a binder vehicle.

The present invention uses both a glyceride and a sorbitan ester at the same time to achieve a synergetic effect. Singular use of either ester improves the dispersibility and surface quality of the resulting film to some extent, but never satisfactorily. Investigations have revealed that the combined amount of the both esters in the range of 1–5% by weight (on the basis of the weight of the magnetic substance) gives good result, although the range depends on the type of the binder and the surface condition of the magnetic particles. It has also been found that the synergetic effect is attained by varying the mixing ratio of the two esters over a fairly broad range. Of glycerides and sorbitan esters, those particularly desirable for the purposes of the invention have been found to be the esters of higher fatty acids, such as stearic, oleic, and palmitic acids.

The invention is illustrated by the following examples.

EXAMPLE 1

| | |
|---|---|
| Acicular magnetic alloy particles (average major axis 0.4 μm, average minor axis 0.04 μm) | 400 parts |
| Glyceryl monostearate ("Atmul 84" marketed by Kao Soap Co.) | 6 parts |
| Sorbitan monostearate ("Span 60" marketed by Kao Soap Co.) | 6 parts |
| Vinyl chloride-vinyl acetate-vinyl alcohol copolymer ("VAGH" marketed by UCC) | 60 parts |
| Polyurethane resin ("Nippollan 2304" marketed by Nippon Polyurethane Ind. Co.) | 114 parts |
| Methyl ethyl ketone | 600 parts |
| Methyl isobutyl ketone | 300 parts | were first mixed with agitation on a high speed dispersion mill and then thoroughly mixed and dispersed on a sand grinder mill. With the addition of 20 parts polyisocyanate ("Coronate" marketed by Nippon Polyurethane Ind. Co.) as a curing agent, the whole mixture was kneaded to form a magnetic coating material. The material was applied to a polyester terephthalate film, and the coated film surface was finished by calendering. The magnetic recording medium thus obtained had a squareness ratio of 0.87.

EXAMPLES 2, 3, AND 4

Magnetic recording media were made by the same procedure as described in Example 1 with the exception that the proportions of the glyceride and sorbitan ester were varied as tabulated below. The effects of varied proportions upon the squareness ratio of the products, together with the results of Example 1, are also shown in the same table.

COMPARATIVE EXAMPLE 1

A magnetic recording medium was made in the same way as described in Example 1, excepting that the glyceryl monostearate alone was used instead of the two esters. The results are given in the table.

COMPARATIVE EXAMPLE 2

A magnetic recording medium was made in the same way as in Example 1, excepting that the sorbitan monostearate alone was used instead of the two esters. The results are also given in the table.

|  | Kind of glyceride and/or sorbitan ester | Qty. added (PHP)* | Squareness ratio |
|---|---|---|---|
| Example | | | |
| 1 | Glyceryl monostearate ("Atmul 84" of Kao Soap) | 1.5 | 0.87 |
|  | Sorbitan monostearate ("Span 60" of Kao Soap) | 1.5 | |
| 2 | Glyceryl monostearate-monooleate ("Atmul 124" of Kao Soap) | 1.5 | |
|  | Sorbitol monostearate ("Span 60" of Kao Soap) | 1.5 | 0.86 |
| 3 | Glyceryl monooleate ("Atmos 300" of Kao Soap) | 1.5 | |
|  | Sorbitan monostearate ("Span 60" of Kao Soap) | 1.5 | 0.87 |
| 4 | Glyceryl monostearate ("Atmul 84" of Kao Soap) | 1.5 | |
|  | Sorbitan monopalmitate ("Span 40" of Kao Soap) | 1.5 | 0.87 |
| Comp. Ex. | | | |
| 1 | Glyceryl monostearate ("Atmul 84" of Kao Soap) | 3.0 | 0.85 |
| 2 | Sorbitan monostearate ("Span 60" of Kao Soap) | 3.0 | 0.84 |

*The quantity of the additive in parts per 100 parts of the magnetic particles.

It will be understood from the table that the mixtures of glyceride and sorbitan ester, whatever the combination, gave greater squareness ratios than by singular use of either ester. Offering the advantageous characteristic not attained by each ester alone, the esters in combined use achieve the object of the invention.

The ferromagnetic particles employed for the examples were acicular ferromagnetic alloy particles with a major axis of 0.4 μm and a minor axis of 0.04 μm. For the purposes of the invention, other magnetic particles commonly used for magnetic recording media, such as gamma ferric oxide, cobalt-doped ferric oxide, and acicular magnetite, may be employed as satisfactorily.

The fatty acids on the basis of which the glycerides and sorbitan esters for the present invention are formed include, especially, such higher fatty acids as stearic, oleic, and palmitic acids.

Also, while monoesters alone were used in the examples of the invention, it should be obvious to those skilled in the art that di- and triesters may serve the purposes as well, within the spirit and scope of the invention.

We claim:

1. A magnetic recording medium carrying means for recording magnetic information comprised of a non-magnetic base and a magnetic coating layer fixed on said base, said magnetic coating layer comprises ferromagnetic particles dispersed in a binder vehicle, characterized in that said magnetic coating layer contains a glyceride and a sorbitan ester of fatty acid.

2. A magnetic recording medium according to claim 1, wherein said glyceride and a sorbitan ester are contained in a combined amount of 1 to 5% by weight on the basis of the weight of the ferromagnetic particles.

3. A magnetic recording medium according to claim 1 or 2, wherein said fatty acid forming said sorbitan ester is selected from the group consisting of stearic acid, oleic acid and palmitic acid.

4. A magnetic recording medium according to claim 1 or 2, wherein said glyceride is selected from the group consisting of glycerides of stearic acid, oleic acid and palmitic acid.

5. A magnetic recording medium according to claim 1 or 2, wherein said ferromagnetic particles are acicular magnetic particles of an alloy composed chiefly of iron.

* * * * *